(12) United States Patent
Takahashi et al.

(10) Patent No.: US 7,772,736 B2
(45) Date of Patent: Aug. 10, 2010

(54) PERMANENT MAGNET SYNCHRONOUS MOTOR, ROTOR OF THE SAME, AND COMPRESSOR USING THE SAME

(75) Inventors: Akeshi Takahashi, Hitachi (JP); Haruo Koharagi, Hitachi (JP); Satoshi Kikuchi, Hitachi (JP); Tomio Yoshikawa, Shimizu (JP); Baiying Huang, Shimizu (JP)

(73) Assignee: Hitachi Appliances, Inc., Tokyo (JP)

(*) Notice: Subject to any disclaimer, the term of this patent is extended or adjusted under 35 U.S.C. 154(b) by 456 days.

(21) Appl. No.: 11/758,097

(22) Filed: Jun. 5, 2007

(65) Prior Publication Data

US 2007/0284961 A1   Dec. 13, 2007

(30) Foreign Application Priority Data

Jun. 9, 2006 (JP) ............................. 2006-160416
Nov. 17, 2006 (JP) ............................. 2006-310937

(51) Int. Cl.
  *H02K 21/12* (2006.01)
(52) U.S. Cl. ............................. 310/156.78; 310/156.57
(58) Field of Classification Search ............ 310/156.78, 310/156.57
  See application file for complete search history.

(56) References Cited

U.S. PATENT DOCUMENTS

| | | | | |
|---|---|---|---|---|
| 6,218,753 B1* | 4/2001 | Asano et al. | ............ | 310/156.53 |
| 6,552,462 B2* | 4/2003 | Sakai et al. | ............ | 310/156.78 |
| 6,570,290 B2* | 5/2003 | Kazmierczak | .............. | 310/184 |
| 7,102,264 B2* | 9/2006 | Yanashima et al. | ..... | 310/156.57 |

FOREIGN PATENT DOCUMENTS

| | | |
|---|---|---|
| JP | 2000-284395 | 10/2000 |
| JP | 2002-233087 | 8/2002 |
| JP | 2005-117771 | 4/2005 |

* cited by examiner

*Primary Examiner*—Dang D Le
(74) *Attorney, Agent, or Firm*—Antonelli, Terry, Stout & Kraus, LLP.

(57) ABSTRACT

The inventive self-initiated permanent magnet synchronous motor has a rotor that has two-pole permanent magnets, as well as magnetic substances in a peripheral direction between the magnetic poles of the permanent magnets. The present invention provides a high-efficiency, high-torque permanent magnet synchronous motor with an improved power factor, its rotor, and a compressor using the permanent magnet synchronous motor, without a reduction in the maximum torque and an increase in costs.

11 Claims, 16 Drawing Sheets

PERMANENT MAGNET SYNCHRONOUS MOTOR, ROTOR OF THE SAME, AND COMPRESSOR USING THE SAME

CLAIM OF PRIORITY

The present application claims priority from Japanese application serial no. 2006-160416, filed on Jun. 9, 2006, and Japanese application serial no. 2006-310937, filed on Nov. 17, 2006, the contents of which are hereby incorporated by reference into this application.

FIELD OF THE INVENTION

The present invention relates to a permanent magnet synchronous motor, its rotor, and a compressor that using the permanent magnet synchronous motor.

BACKGROUND OF THE INVENTION

Induction motors have been used as driving sources of compressors that are mounted in electronic refrigerators, air conditioners, and the like and that operate at constant speed and thereby do not require speed control. The induction motor is advantageous in that it has a robust structure. Furthermore, the induction motor can be structured inexpensively because it can be directly initiated with commercial power. As needs for high efficiency have been increasingly raised, there is a desire for development of self-initiated permanent magnet synchronous motors that can be initiated by itself with commercial power and can achieve high-efficiency operation.

The self-initiated permanent magnet synchronous motor has cage-type conductors used for initiation along the outer rotor periphery. Permanent magnets need to be disposed along the inner periphery of the cage-type conductors, imposing a limit on a space in which the magnets are disposed. Methods of increasing the efficiency of this type of motor and obtaining high torque from it are disclosed in, for example, Patent Document 1 (Japanese patent laid-open No. 2002-233087) and Patent Document 2 (Japanese patent laid-open No. 2005-117771). In each method, arrangement of permanent magnets is optimized in a limited space.

From the viewpoint of direct driving with commercial power, a power factor is also an important design target. The power factor is an index indicating how efficiently power supplied from the electric power company is used; the higher the power factor of a unit is, the more efficiently the unit uses power generated by the electric power company. Major electric power companies give a discount when the power factor is 85% or more, and charges an extra fee when the power factor is less than 85%. Accordingly, whether the power factor is at least 85% is a very important guide in a phase in which a self-initiated permanent magnet synchronous motor is designed. However, this is not addressed in the Patent Documents 1 and 2.

SUMMARY OF THE INVENTION

Methods of increasing the power factor include increasing the number of windings on an armature and increasing the amount of magnet material. These methods increase an induced electromotive force generated by magnets and thus relatively reduce current to generate a magnet torque, thereby increasing the power factor. In the former method, however, as the number of windings increases, the resistance and inductance increase, raising a problem in that the maximum torque is reduced. A problem with the latter method is an increase in costs by an amount equivalent to an additional amount of magnet material.

An object of the present invention is to provide a high-efficiency permanent magnet synchronous motor with an improved power factor, its rotor, and a compressor using the permanent magnet synchronous motor, without a reduction in the maximum torque and an increase in costs.

In a permanent magnet synchronous motor having a stator with a stator winding and a rotor rotatably supported along the inner periphery of the stator with a fixed clearance therebetween and including many slots provided in the axial direction along the outer periphery of a rotor iron core, which is part of the rotor, electrically conductive bars embedded in the slots, electrically conductive end rings, each of which connects one of the bars to an end surface in the axial direction, and two-pole permanent magnets embedded along the inner periphery of the bars, the permanent magnet synchronous motor of the present invention has holes and magnetic substances in a peripheral direction between the magnetic poles of the permanent magnets, the magnetic substance being larger than a bridge between the permanent magnet and the hole.

The present invention can provide a high-efficiency, high-torque permanent magnet synchronous motor with an improved power factor, its rotor, and a compressor using the permanent magnet synchronous motor, without an increase in costs.

DESCRIPTION OF THE PREFERRED EMBODIMENTS

Embodiments of the present invention will be described with reference to the drawings.

First Embodiment

Figure 1:
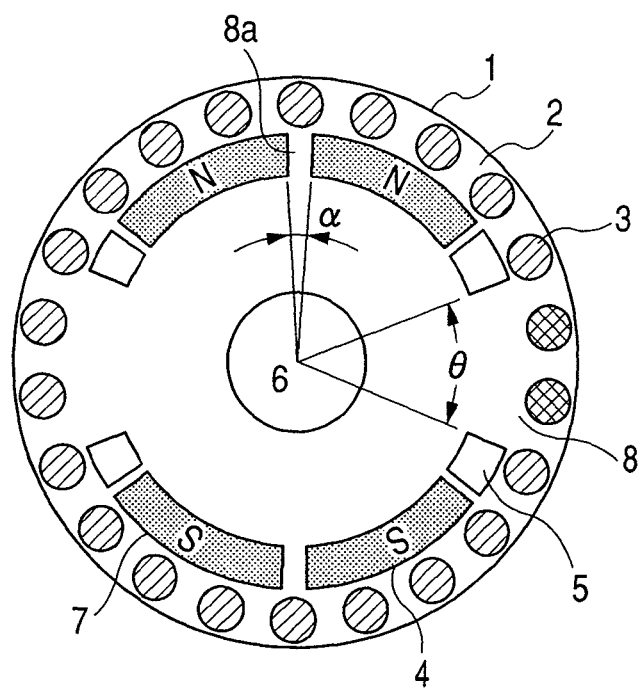
FIG. 1 shows the radial cross section of the rotor of a permanent magnet synchronous motor according to a first embodiment of the present invention.

FIG. 1 shows the radial cross section of the rotor of a permanent magnet synchronous motor according to a first embodiment of the present invention. The rotor 1 has many cage-type windings 3, which are used for the initiation of the motor, inside a rotor iron core 2 disposed on a shaft 6, and includes permanent magnets 4, the main ingredient of which is a rare earth element, which are embedded in magnet insertion holes 7, the number of magnetic poles being two. The permanent magnet synchronous motor has holes 5 and magnetic substances 8 between the magnetic poles of the permanent magnets 4. A pitch angle θ of the magnetic substance 8 in the peripheral direction is larger than a total α of the angles of bridges 8a, each of which is included in one magnetic pole of the permanent magnets 4. The bridges 8a are provided to increase the strength of the rotor 1. The magnetic substance 8 may be formed by punching a silicon steel plate to make holes and then injecting iron or the like into the silicon steel plate. Alternatively, the silicon steel plate may be used as it is, without being punched. The rotor iron core 2 may be formed with a powder-molded article such as a powder magnetic core. Furthermore, the rotor iron core 2 may be integrated with the permanent magnets 4.

For simplicity, a case in which α is 2° will be considered below. The maximum value of θ/α is 21.

Figure 2:
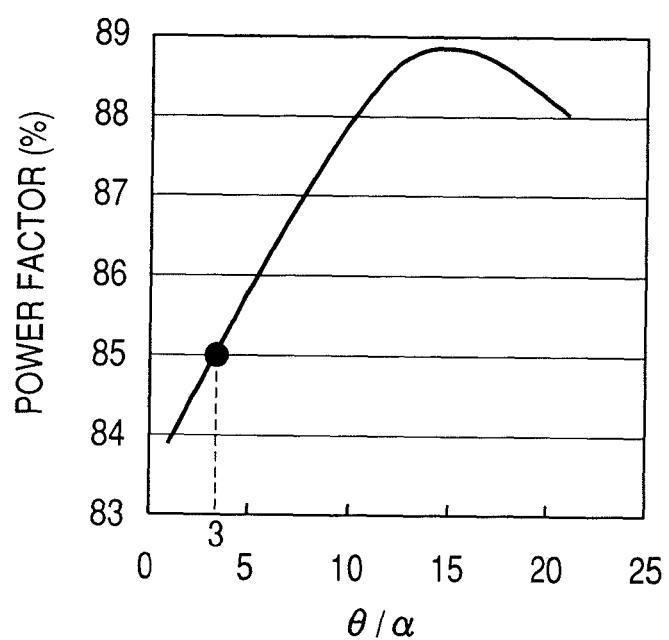
FIG. 2 shows the relation between $\theta/\alpha$ and the power factor in the first embodiment of the present invention.

FIG. 2 shows the relation between θ/α and the power factor during a rated operation. It is noted from FIG. 2 that when θ is greater than α, the power factor can be improved. When θ/α is less than or equal to 3, a power factor of 85% or more can be achieved, which is more preferable. When θ/α is 15, the power factor is maximized. The reason why the power factor is improved by setting the θ/α as described above will be given below. When θ/α is less than 15, the reluctance torque increases as θ/α gradually increases, and thus the magnet torque can be relatively reduced by an amount equivalent to the reduction. That is, it suffices to flow lower current, improving the power factor. When θ/α is greater than 15, a leak magnetic flux between the magnetic poles increases. Accordingly, a reduction in the magnetic torque is more significant than the increase in the reluctance torque, and extra current is required to compensate for the reduction, lowering the power factor.

Figure 3:
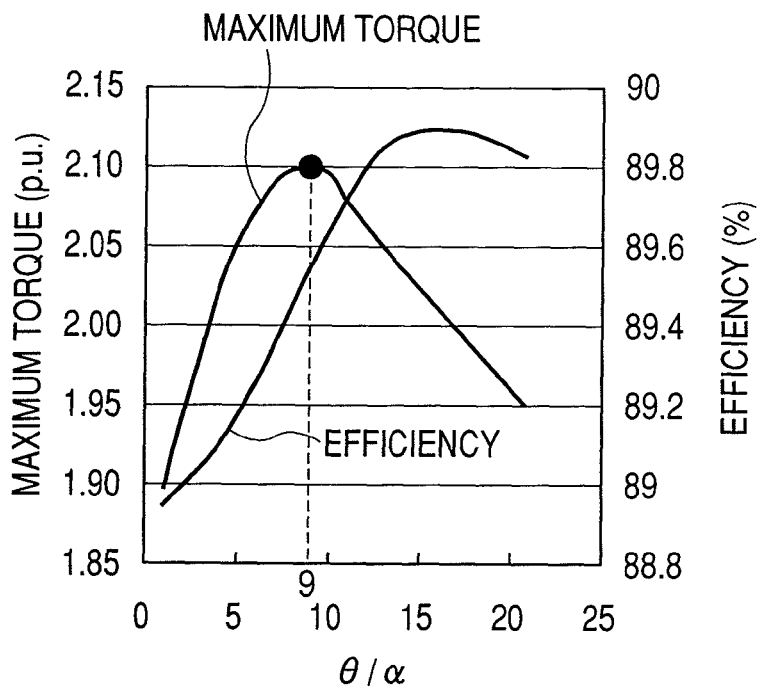
FIG. 3 shows the relation between $\theta/\alpha$ and the efficiency and the relation between $\theta/\alpha$ and the maximum torque in the first embodiment.

FIG. 3 shows the relation between θ/α and the maximum torque and the relation between θ/α and the rated efficiency. The maximum torque is represented relative to the rated torque. It is noted from the drawing that when θ is greater than α, the maximum torque can be improved, because an increase in the reluctance torque contributes to the increase in the maximum torque. This is also true for the efficiency; when the reluctance torque increases, less current is sufficient and the efficiency is improved. When θ/α reaches 9, the maximum torque turns to decrease, because when the inductance increases due to an increase in the magnetic substance between the magnetic poles, the load angle increases and thereby a loss of synchronization easily occurs.

Even when the permanent magnets 4 in FIG. 1 are disposed straightly or in a V, trapezoidal, or approximately circular arc shape, characteristics similar to those in FIG. 1 can also be obtained.

Second Embodiment

Figure 4:
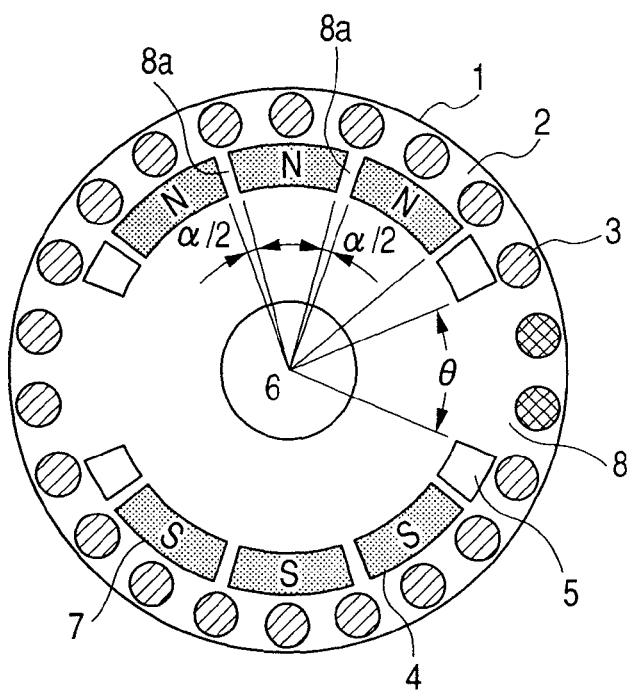
FIG. 4 shows the radial cross section of the rotor of a permanent magnet synchronous motor according to a second embodiment of the present invention.

FIG. 4 shows the radial cross section of the rotor of a permanent magnet synchronous motor according to another embodiment of the present invention. In FIG. 4, components identical to those in FIG. 1 are assigned the same reference numerals, and duplicate explanation will be eliminated. FIG. 4 differs from FIG. 1 in that three permanent magnets are provided for each magnetic pole, amounting to a total of two bridges. Characteristics similar to those in FIG. 1 can also be obtained from this structure.

Third Embodiment

Figure 5:
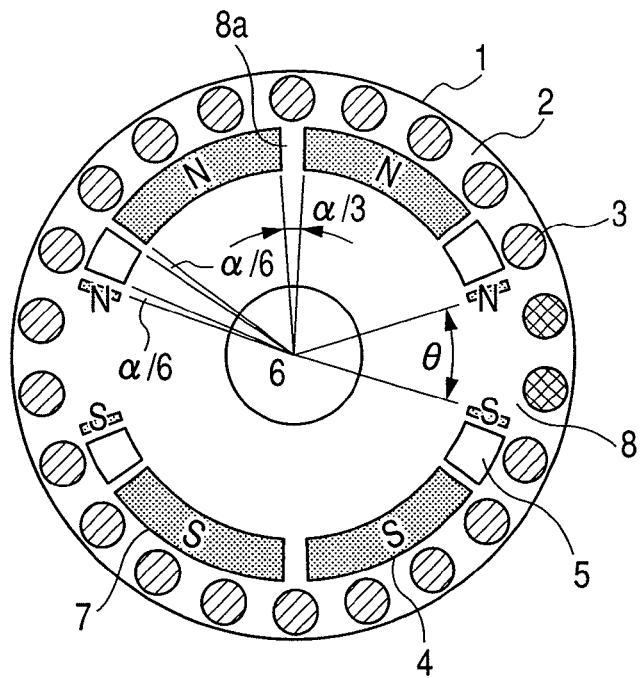
FIG. 5 shows the radial cross section of the rotor of a permanent magnet synchronous motor according to a third embodiment of the present invention.

FIG. 5 shows the radial cross section of the rotor of a permanent magnet synchronous motor according to another embodiment of the present invention. In FIG. 5, components identical to those in FIG. 1 are assigned the same reference numerals, and duplicate explanation will be eliminated. FIG. 5 differs from FIG. 1 in that four permanent magnets are provided for each magnetic pole, amounting to a total of six bridges. Characteristics similar to those in FIG. 1 can also be obtained from this structure.

Fourth Embodiment

Figure 6:
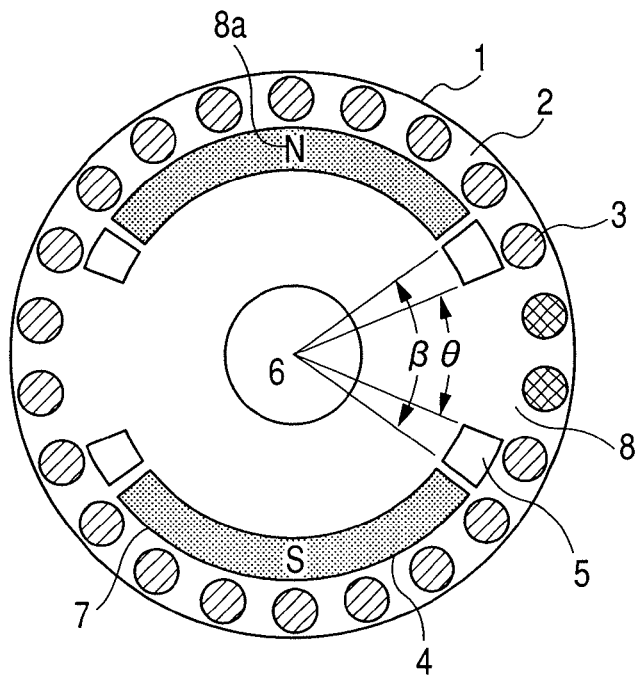
FIG. 6 shows the radial cross section of the rotor of a permanent magnet synchronous motor according to a fourth embodiment of the present invention.

FIG. 6 shows the radial cross section of the rotor of a permanent magnet synchronous motor according to another embodiment of the present invention. In FIG. 6, components identical to those in FIG. 1 are assigned the same reference numerals, and duplicate explanation will be eliminated. FIG. 6 differs from FIG. 1 in that there is no bridge 8a in a magnetic pole. In this structure, a ratio $\theta/\beta$ of a pitch angle $\theta$ of the magnetic substance 8 in the peripheral direction to the pitch angle $\beta$ between the magnetic poles in the peripheral direction is set within a range of 0.17 to 0.80. The magnetic substance 8 may be formed by punching a silicon steel plate to make holes and then injecting iron or the like into the silicon steel plate. Alternatively, the silicon steel plate may be used as it is, without being punched. The rotor iron core 2 may be formed with a powder-molded article such as a powder magnetic core. Furthermore, the rotor iron core 2 may be integrated with the permanent magnets 4.

Figure 7:
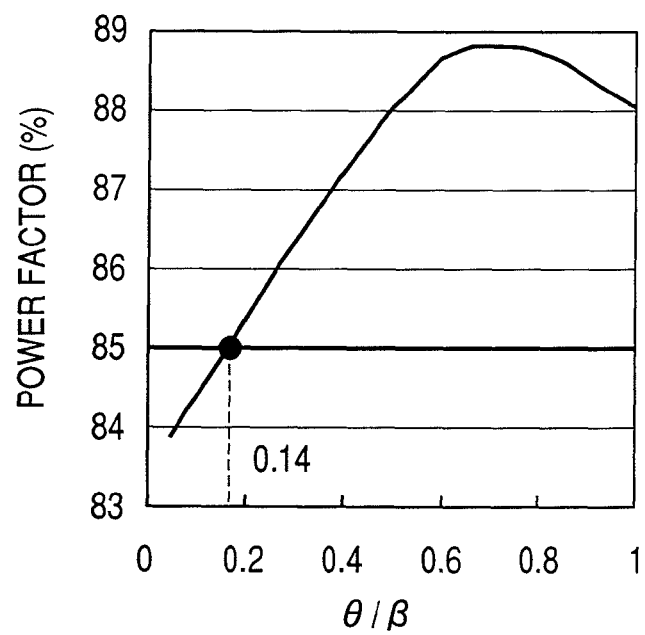
FIG. 7 shows the relation between $\theta/\beta$ and the power factor in the fourth embodiment.

FIG. 7 shows the relation between $\theta/\beta$ and the power factor during a rated operation. The power factor is an index indicating how efficiently power supplied from the electric power company is used; the higher the power factor of a unit is, the more efficiently the unit uses power generated by the electric power company. That is, for electric power companies, improvements of the power factors of individual units mean suppression of unnecessary power consumption, which in turn leads to a reduction in facility capacities. Accordingly, in the recent electric power industry, a power factor discount system based on contracted power has been established, which promotes activity to lower loads of existing electric facilities. Specifically, major electric power companies give a discount when the power factor is 85% or more, and charges an extra fee when the power factor is less than 85%. For this reason, whether the power factor is at least 85% is a very important guide. It is noted from FIG. 7 that when $\theta/\beta$ is less than or equal to 0.14, a power factor of 85% or more can be achieved and that when $\theta/\beta$ is 0.71, the power factor is maximized. The reason why the power factor is improved by setting the $\theta/\beta$ as described above will be given below. When $\theta/\beta$ is less than 0.71, the reluctance torque increases as $\theta/\beta$ gradually increases from 0, and thus the magnet torque can be relatively reduced by an amount equivalent to the reduction. That is, it suffices to flow lower current, improving the power factor. When $\theta/\beta$ is greater than 0.71, a leak magnetic flux between the magnetic poles increases. Accordingly, a reduction in the magnetic torque is more significant than the increase in the reluctance torque, and extra current is required to compensate for the reduction, lowering the power factor.

Figure 8:
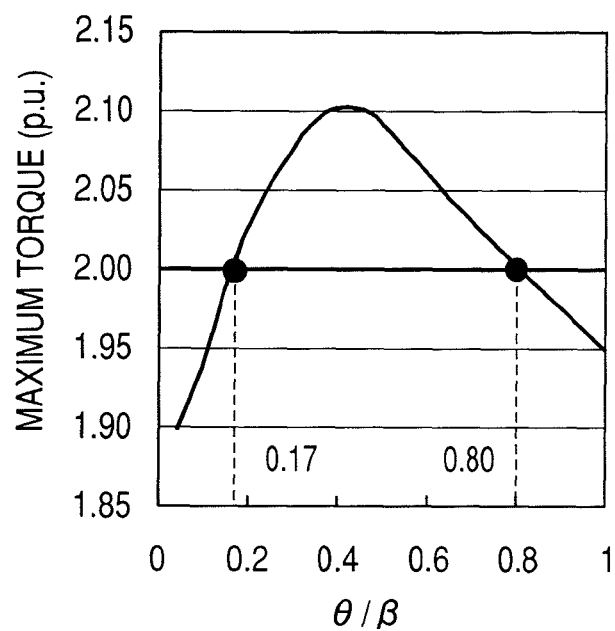
FIG. 8 shows the relation between $\theta/\beta$ and the maximum torque in the fourth embodiment.

FIG. 8 shows the relation between $\theta/\beta$ and the maximum torque. When $\theta/\beta$ is within the range of 0.17 to 0.80, the maximum torque is 2.0 times or more the rated torque, because an increase in the reluctance torque contributes to the increase in the maximum torque. When $\theta/\beta$ reaches 0.43, the maximum torque turns to decrease, because when the inductance increases due to an increase in the magnetic substance between the magnetic poles, the load angle increases and thereby a loss of synchronization easily occurs. It is stipulated in the Japanese Industrial Standard (JIS) that the maximum torque must be at least twice the rated torque. Accordingly, it is hard for the prior art as indicated in FIGS. 9 and 10 to improve both the power factor and the maximum torque.

Figure 9:
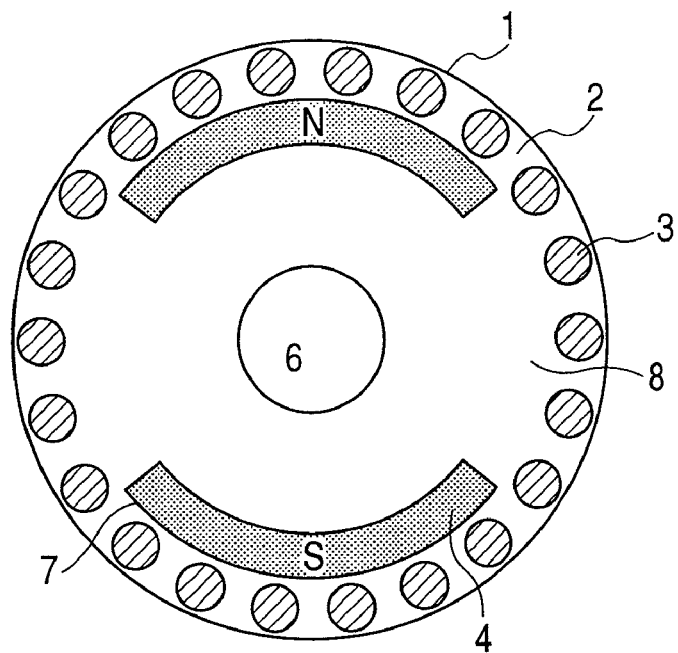
FIG. 9 shows the radial cross section of a conventional rotor structure in which reluctance torque is used.

In FIG. 9, components identical to those in FIG. 6 are assigned the same reference numerals, and duplicate explanation will be eliminated. FIG. 9 differs from FIG. 6 in that there is only a magnetic substance 8 between the magnetic poles; a hole 5 is not formed.

Figure 10:
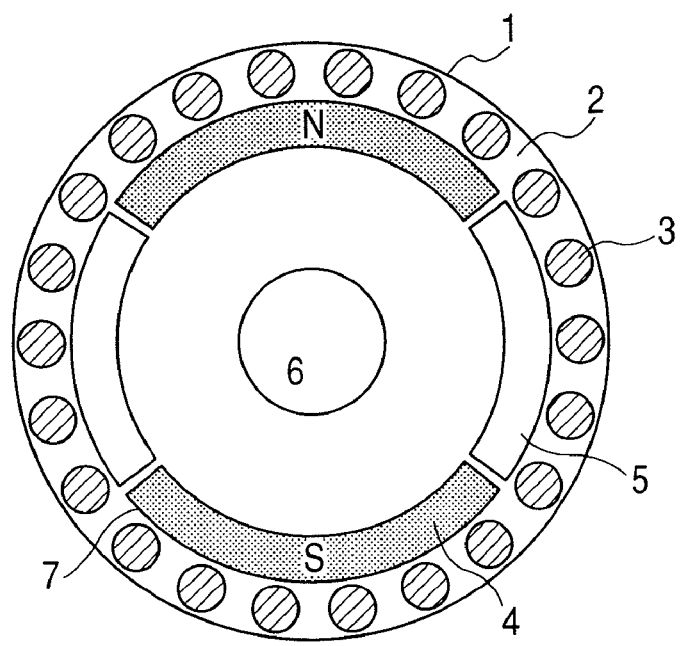
FIG. 10 shows the radial cross section of a conventional rotor structure in which a leak magnetic flux is reduced.

In FIG. 10 as well, components identical to those in FIG. 6 are assigned the same reference numerals, and duplicate explanation will be eliminated. FIG. 10 differs from FIG. 6 in that there are only holes 5 between the magnetic poles and magnetic substances 8 are not provided. The hole 5 may be formed with a non-magnetic substance, a permanent magnet with a small magnetomotive force, or the like.

Figure 11:
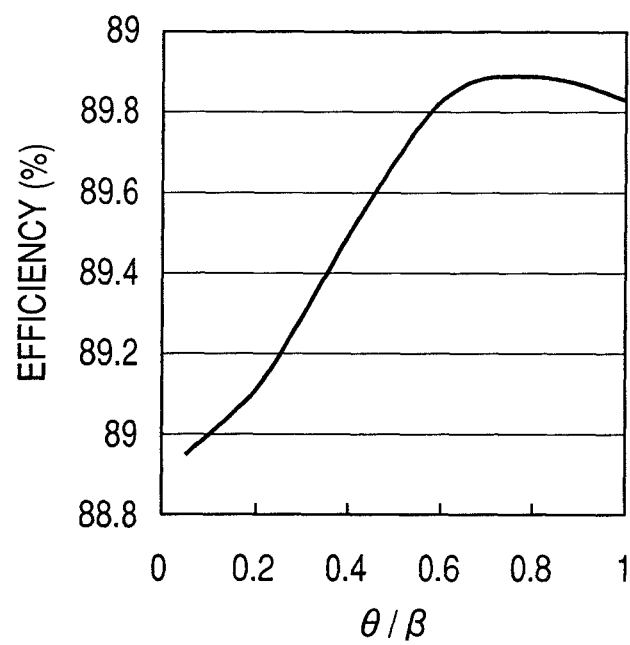
FIG. 11 shows the relation between $\theta/\beta$ and the efficiency in the fourth embodiment.

FIG. 11 shows the relation between $\theta/\beta$ and the efficiency, in which the reluctance torque increases as $\theta/\beta$ increases, and thus the magnet torque can be relatively reduced. That is, it suffices to flow lower current, improving the efficiency.

The results shown in FIGS. 7, 8, and 11 are almost the same as the results shown in FIGS. 2 and 3, indicating that there is little difference between the first embodiment in which the angle of the bridge included in one magnetic pole is 2° and the fourth embodiment in which a bridge is not provided. In embodiments described below, differences from FIG. 6 referenced in the fourth embodiment will be described.

Fifth Embodiment

Figure 12:
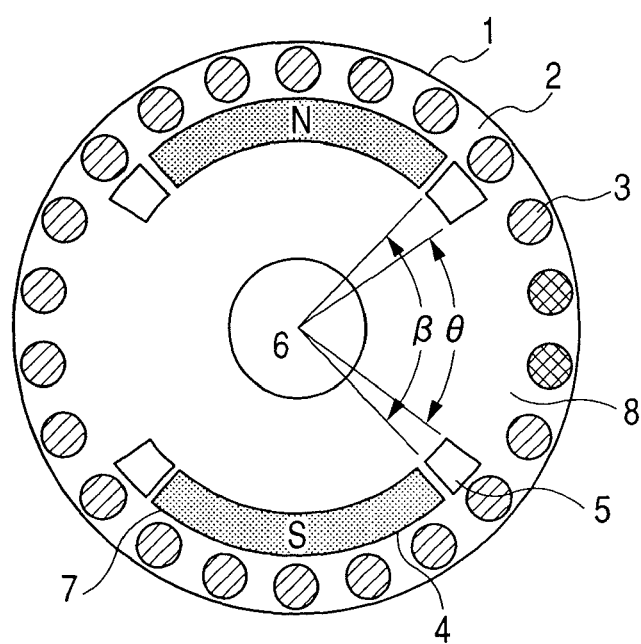
FIG. 12 shows the radial cross section of the rotor of a permanent magnet synchronous motor according to a fifth embodiment of the present invention.

FIG. 12 shows the radial cross section of the rotor of a permanent magnet synchronous motor according to another embodiment of the present invention. In FIG. 12, components identical to those in FIG. 6 are assigned the same reference numerals, and duplicate explanation will be eliminated. FIG. 12 differs from FIG. 6 in that the magnet opening is small and the opening between the magnets is large. Characteristics similar to those in FIG. 6 can also be obtained from this structure.

Sixth Embodiment

Figure 13:
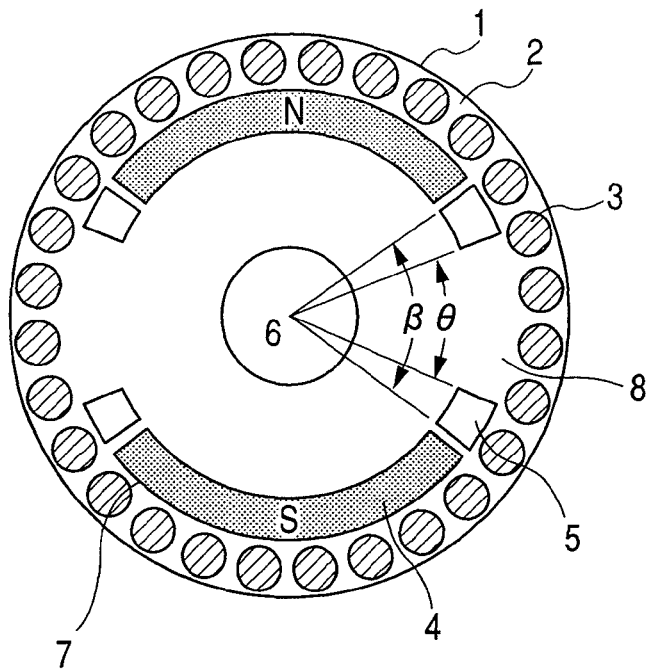
FIG. 13 shows the radial cross section of the rotor of a permanent magnet synchronous motor according to a sixth embodiment of the present invention.

FIG. 13 shows the radial cross section of the rotor of a permanent magnet synchronous motor according to another embodiment of the present invention. In FIG. 13, components identical to those in FIG. 6 are assigned the same reference numerals, and duplicate explanation will be eliminated. FIG. 13 differs from FIG. 6 in that the number of cage-type windings is increased from 22 to 28, and the number of slots in the stator is increased from 30 to 36.

Figure 14:
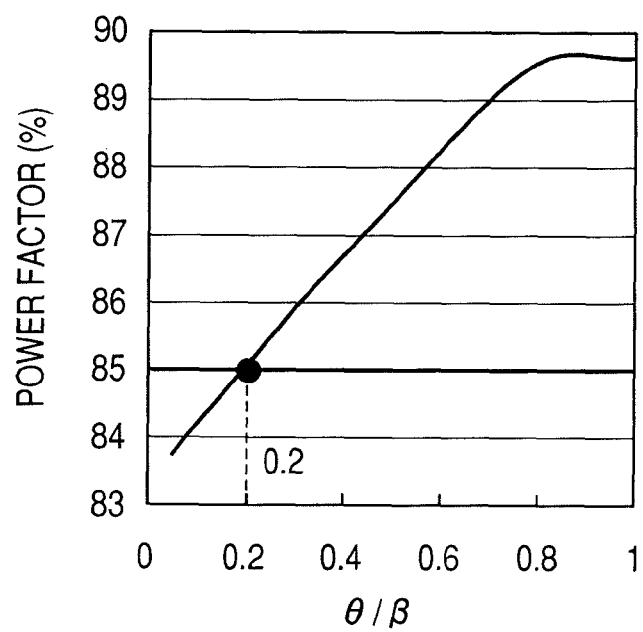
FIG. 14 shows the relation between $\theta/\beta$ and the power factor in the sixth embodiment.

FIG. 14 shows the relation between $\theta/\beta$ and the power factor during a rated operation, in which a power factor of 85% or more is achieved by setting $\theta/\beta$ to 0.20 or more.

Figure 15:
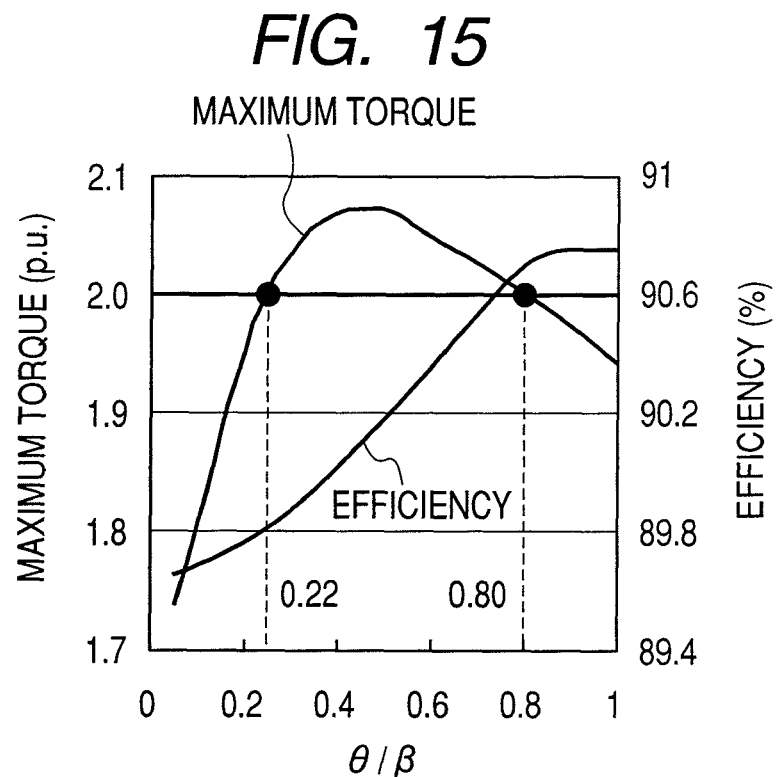
FIG. 15 shows the relation between θ/β and the efficiency and the relation between θ/β and the maximum torque in the sixth embodiment.

FIG. 15 shows the relation between $\theta/\beta$ and the maximum torque and the relation between the $\theta/\beta$ and the efficiency. When the $\theta/\beta$ is within the range of 0.22 to 0.80, the maximum torque is 2.0 or more times the rated torque. The efficiency is improved as compared with a case in which $\theta/\beta$ is 0.

As described above, even when the number of cage-type windings differs, the power factor, efficiency, and maximum torque can be improved by setting $\theta/\beta$ within the range of 0.22 to 0.80.

The effect in the improvement of these characteristics can also be obtained in a structure in which four or more magnetic poles are used.

Seventh Embodiment

Figure 16:
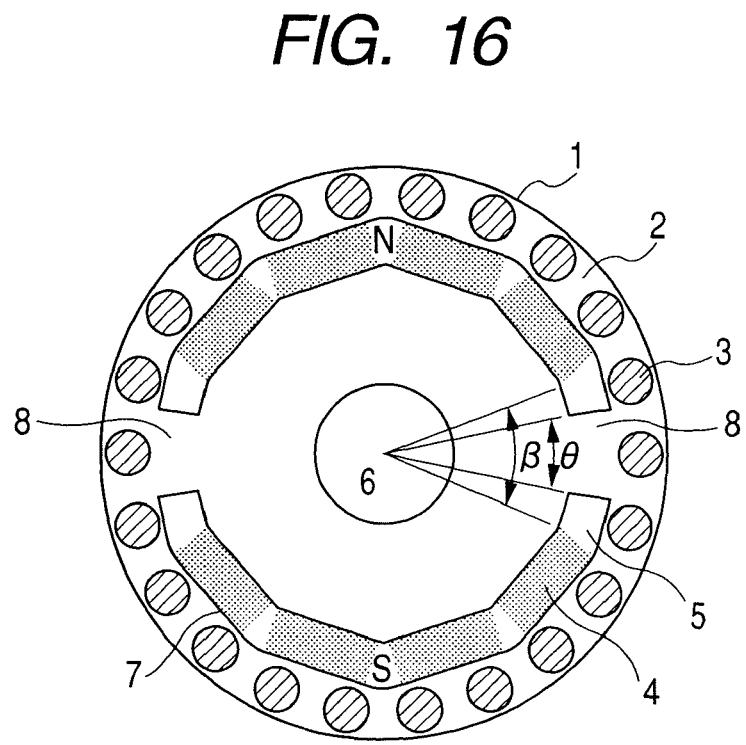
FIG. 16 shows the radial cross section of the rotor of a permanent magnet synchronous motor according to a seventh embodiment of the present invention.

FIG. 16 shows the radial cross section of the rotor of a permanent magnet synchronous motor according to another embodiment of the present invention. In FIG. 16, components identical to those in FIG. 6 are assigned the same reference numerals, and duplicate explanation will be eliminated. FIG. 16 differs from FIG. 6 in that four permanent magnets are provided for each magnetic pole in an approximately circular arc shape. Characteristics similar to those in FIG. 6 can also be obtained from this structure.

Eighth Embodiment

Figure 17:
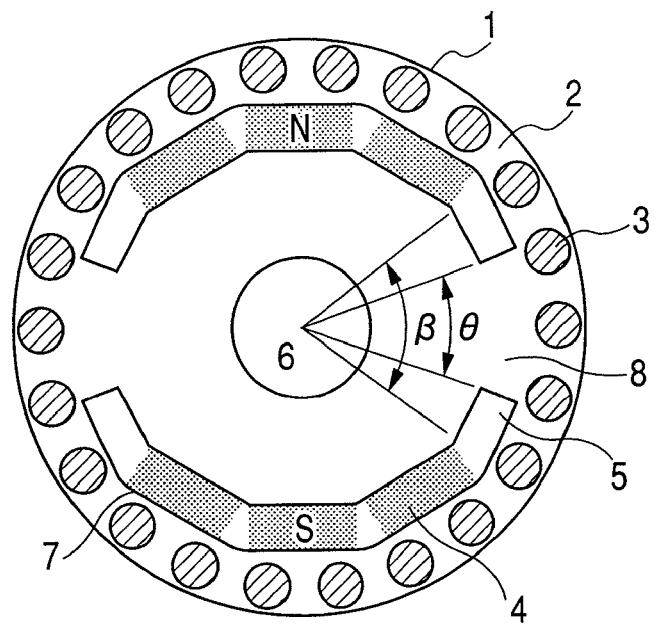
FIG. 17 shows the radial cross section of the rotor of a permanent magnet synchronous motor according to an eighth embodiment of the present invention.

FIG. 17 shows the radial cross section of the rotor of a permanent magnet synchronous motor according to another embodiment of the present invention. In FIG. 17, components identical to those in FIG. 6 are assigned the same reference numerals, and duplicate explanation will be eliminated. FIG. 17 differs from FIG. 6 in that three permanent magnets are provided for each magnetic pole in a trapezoidal shape. Characteristics similar to those in FIG. 6 can also be obtained from this structure.

Ninth Embodiment

Figure 18:
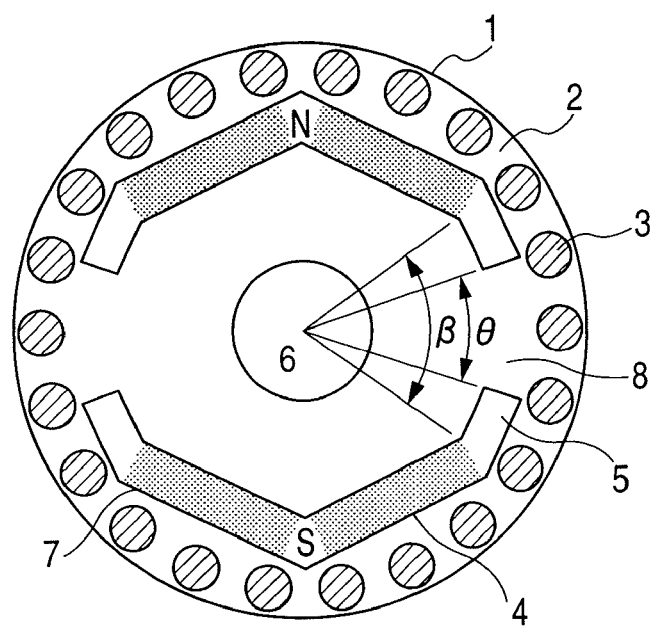
FIG. 18 shows the radial cross section of the rotor of a permanent magnet synchronous motor according to a ninth embodiment of the present invention.

FIG. 18 shows the radial cross section of the rotor of a permanent magnet synchronous motor according to another embodiment of the present invention. In FIG. 18, components identical to those in FIG. 6 are assigned the same reference numerals, and duplicate explanation will be eliminated. FIG. 18 differs from FIG. 6 in that two permanent magnets are provided for each magnetic pole in a V shape. Characteristics similar to those in FIG. 6 can also be obtained from this structure.

Tenth Embodiment

Figure 19:
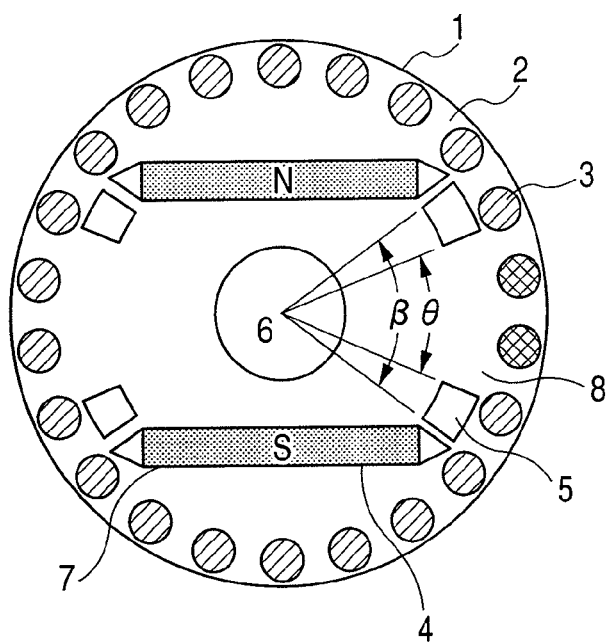
FIG. 19 shows the radial cross section of the rotor of a permanent magnet synchronous motor according to a tenth embodiment of the present invention.

FIG. 19 shows the radial cross section of the rotor of a permanent magnet synchronous motor according to another embodiment of the present invention. In FIG. 19, components identical to those in FIG. 6 are assigned the same reference numerals, and duplicate explanation will be eliminated. FIG. 19 differs from FIG. 6 in that one permanent magnet is provided straightly for each magnetic pole. Characteristics similar to those in FIG. 6 can also be obtained from this structure.

Eleventh Embodiment

Figure 20:
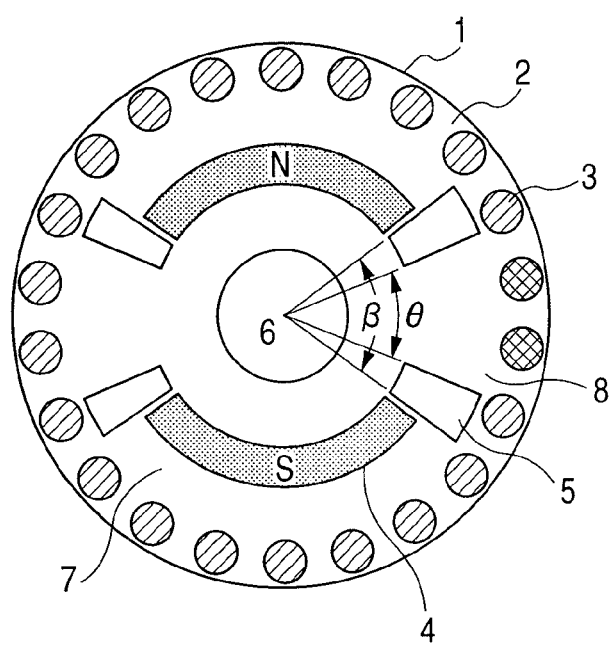
FIG. 20 shows the radial cross section of the rotor of a permanent magnet synchronous motor according to an eleventh embodiment of the present invention.

FIG. 20 shows the radial cross section of the rotor of a permanent magnet synchronous motor according to another embodiment of the present invention. In FIG. 20, components identical to those in FIG. 6 are assigned the same reference numerals, and duplicate explanation will be eliminated. FIG. 20 differs from FIG. 6 in that the permanent magnets are disposed inside the periphery of the conductive bars 3 at some distance from them and that the holes 5 are formed in close contact with the inner periphery of the conductive bars 3. Characteristics similar to those in FIG. 6 can also be obtained from this structure.

Even when the permanent magnets in FIG. 20 are disposed straightly or in a V, trapezoidal, or approximately circular arc shape, characteristics similar to those in FIG. 6 can also be obtained.

Twelfth Embodiment

Figure 21:
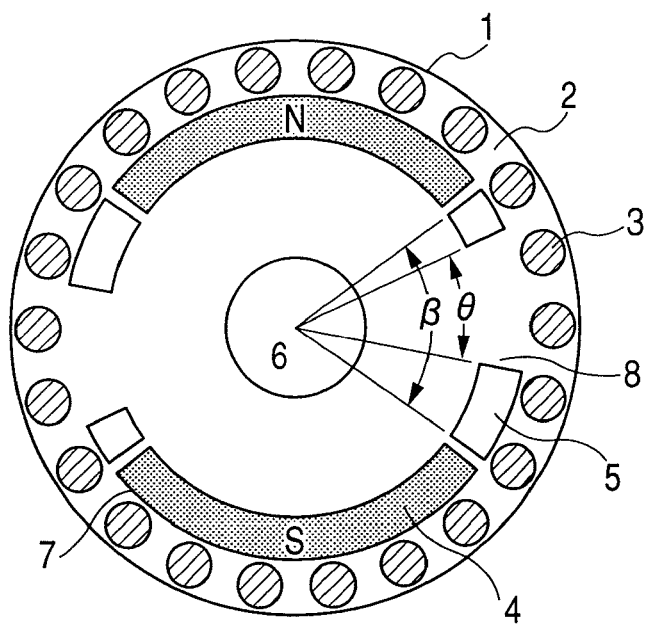
FIG. 21 shows the radial cross section of the rotor of a permanent magnet synchronous motor according to a twelfth embodiment of the present invention.

FIG. 21 shows the radial cross section of the rotor of a permanent magnet synchronous motor according to another embodiment of the present invention. In FIG. 21, components identical to those in FIG. 6 are assigned the same reference numerals, and duplicate explanation will be eliminated. FIG. 21 differs from FIG. 6 in that the holes and magnetic substances between the magnetic poles have asymmetry with respect to a central line extending in the radial direction between the magnetic poles. Characteristics similar to those in FIG. 6 can also be obtained from this structure.

Thirteenth Embodiment

Figure 22:
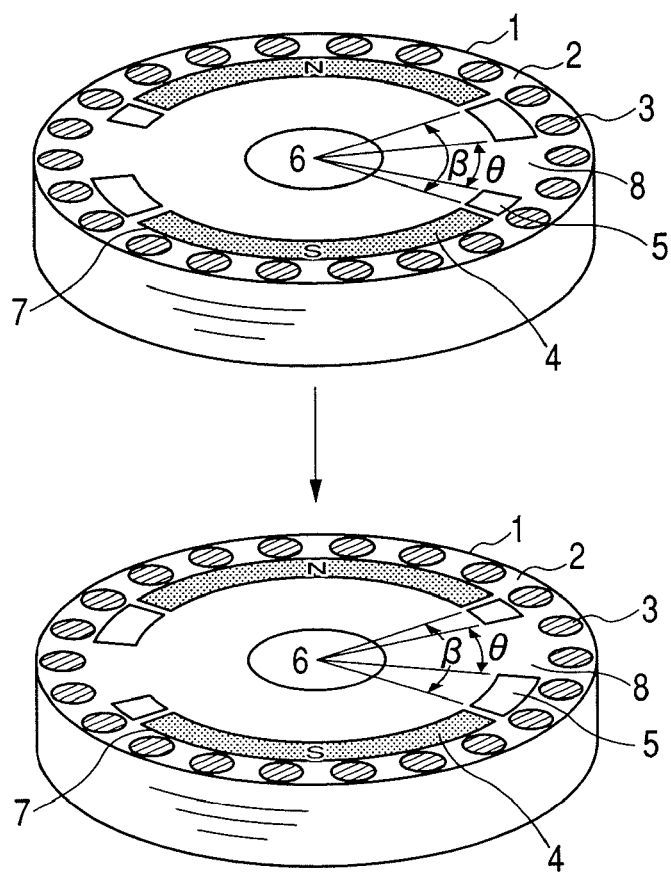
FIG. 22 shows the radial cross section of the rotor of a permanent magnet synchronous motor according to a thirteenth embodiment of the present invention.

FIG. 22 shows the radial cross section of the rotor of a permanent magnet synchronous motor according to another embodiment of the present invention. In FIG. 22, components identical to those in FIG. 6 are assigned the same reference numerals, and duplicate explanation will be eliminated. In FIG. 22, two steel plates are laminated. The lower steel plate has the same structure as shown in FIG. 21, that is, the holes and magnetic substances between the magnetic poles have asymmetry with respect to a central line extending in the radial direction between the magnetic poles. The upper steel plate is formed by inverting the steel plate shown in FIG. 21 with respect to a central line extending in the radial direction between the magnetic poles, and placed on the lower steel plated. When these two steel plates are laminated radially in this way, torque pulsation can be reduced.

Fourteenth Embodiment

Figure 23:
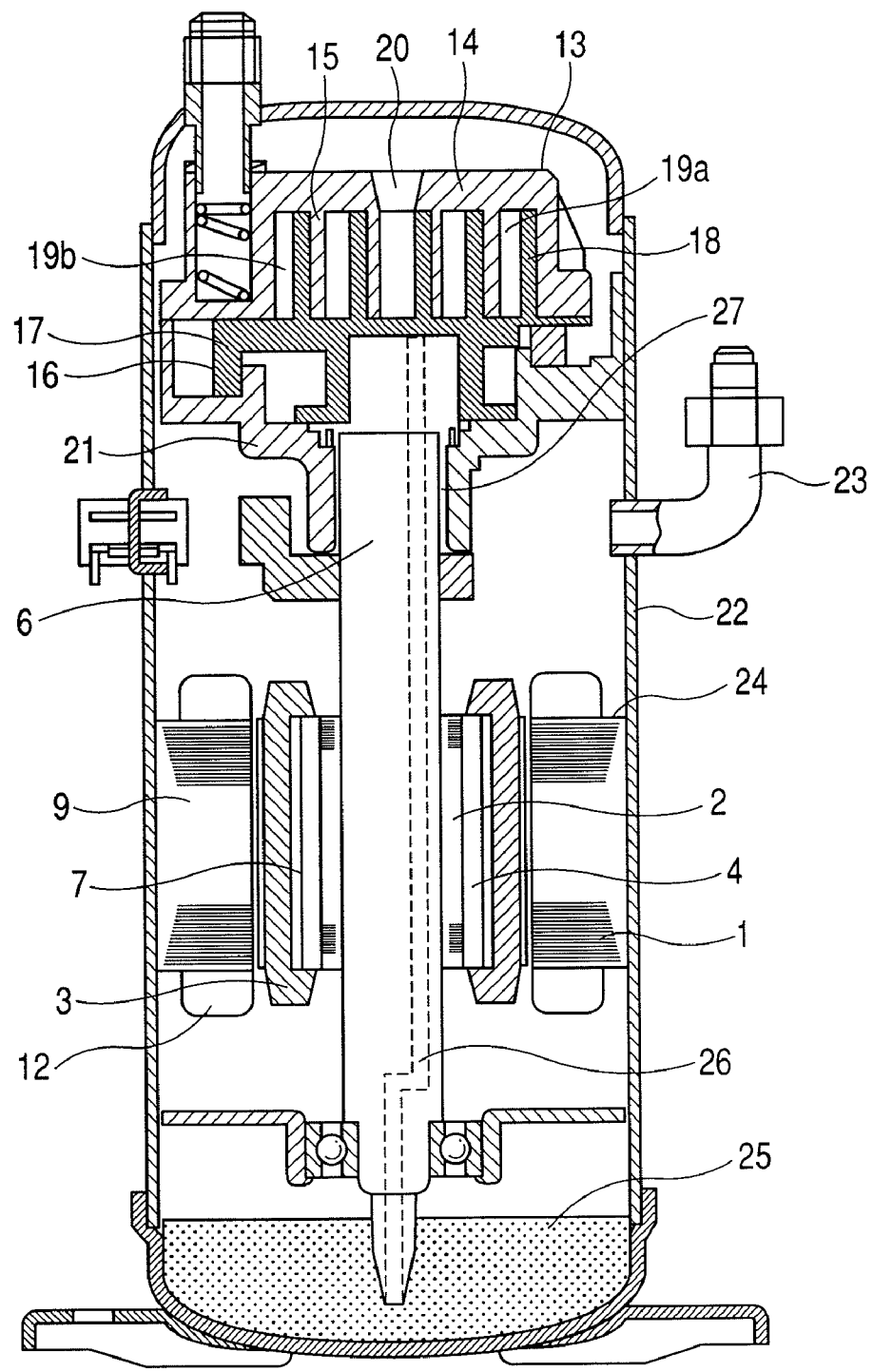
FIG. 23 shows the cross section of a compressor according to an embodiment of the present invention.

FIG. 23 shows the cross section of a compressor according to an embodiment of the present invention. The compressing mechanical part in FIG. 23 is structured by engaging spiral wraps 15 and other spiral wraps 18, the spiral wraps 15 being disposed upright on an end plate 14 of a fixed scroll member 13, the spiral wraps 18 being disposed upright on an end plate 17 of a rotating scroll member 16. When the rotating scroll member 16 is rotated by a crank shaft 6, a compressing operation is performed.

Compression chambers 19 (19*a*, 19*b*, and so on) are defined by the fixed scroll member 13 and the rotating scroll member 16. Compression chambers 19 that are disposed at the most outer peripheral portion move toward the centers of the fixed scroll member 13 and the rotating scroll member 16 during rotating motion, gradually reducing the volume of these compression chambers 19.

When the compression chambers 19*a* and 19*b* almost reach the centers of the fixed scroll member 13 and rotating scroll member 16, the compressed gas in the compression chambers 19 is expelled from a discharge port 20, which communicates with the compression chambers 19. The expelled compressed gas is delivered through a gas path (not shown) disposed in the fixed scroll member 13 and a frame 21 to a compression vessel 22 disposed below the frame 21, and then expelled to the outside of the compressor through a discharge pipe 23 provided on the side wall of the compression vessel 22. A permanent magnet synchronous motor 24, comprising a stator 9 and a rotor 1 as shown in FIGS. 1 to 22, is hermetically included in the compression vessel 22. The permanent magnet synchronous motor 24 rotates at fixed revolutions to perform a compression operation.

An oil reservoir 25 is provided below the permanent magnet synchronous motor 24. Oil in the oil reservoir 25 is supplied through an oil passage 26 provided in the crank shaft 6 to a sliding part between the rotating scroll member 16 and the crank shaft 6, a sliding bearing 27, and other components by use of a pressure difference caused by rotational motion, the oil being used to lubricate these components.

Accordingly, when one of the permanent magnet synchronous motors shown in FIGS. 1 to 22 is used as a compressor driving motor, the power factor, efficiency, and torque of a compressor at a constant speed can be increased.

The embodiments described above can each provide a permanent magnet synchronous motor with a rotor structure that provides a necessary maximum torque and can increase the power factor and efficiency without involving an increase in costs, as well as its rotor and a compressor that uses the permanent magnet synchronous motor.

Although permanent magnet synchronous motors with two-pole permanent magnets have been described in the above embodiments, the permanent magnets are not limited to two magnetic poles; a similar effect is obtained from other than two magnetic poles.

Fifteenth Embodiment

Figure 24:
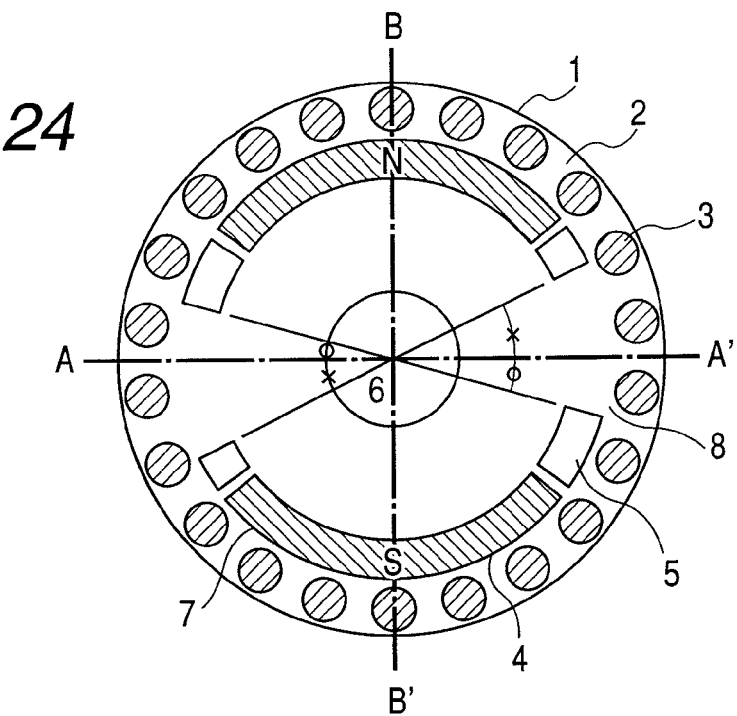
FIG. 24 shows the radial cross section of the rotor of a self-initiated permanent magnet synchronous motor according to a fifteenth embodiment of the present invention.

FIG. 24 shows the radial cross section of the rotor of a self-initiated permanent magnet synchronous motor according to a fifteenth embodiment of the present invention. The rotor 1 has many cage-type windings 3, which are used for the initiation of the motor, inside a rotor iron core 2 disposed on a shaft 6, and includes permanent magnets 4, the main ingredient of which is a rare earth element, which are embedded in magnet insertion holes 7, the number of magnetic poles being two. The self-initiated permanent magnet synchronous motor has holes 5 and magnetic substances 8 between the magnetic poles of the permanent magnets 4. The holes 5 and magnetic substances 8 are arranged so that they have asymmetry with respect to the central line A-A' extending in the radial direction between the magnetic poles of a permanent magnets 4. The magnetic substance 8 may be formed by punching a silicon steel plate to make holes and then injecting iron or the like into the silicon steel plate. Alternatively, the silicon steel plate may be used as it is, without being punched. The rotor iron core 2 may be formed with a powder-molded article such as a powder magnetic core. Furthermore, the rotor iron core 2 may be integrated with the permanent magnets 4.

Figure 25:
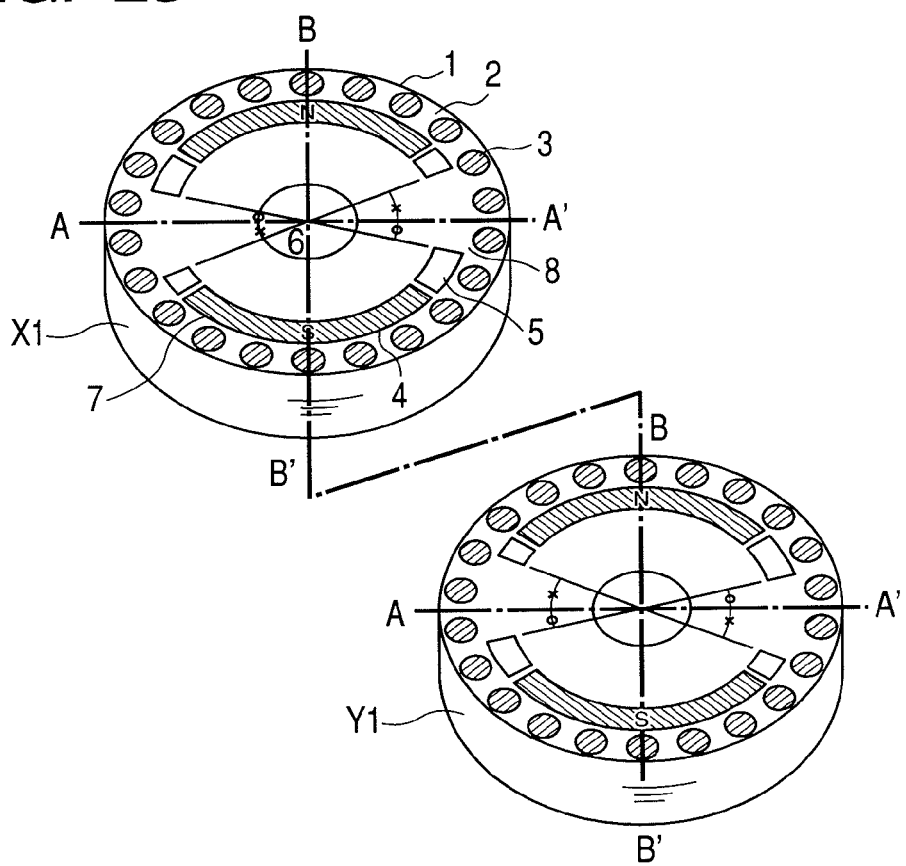
FIG. 25 shows an axial lamination of the rotor of a self-initiated permanent magnet synchronous motor according to the fifteenth embodiment of the present invention.
Figure 26:
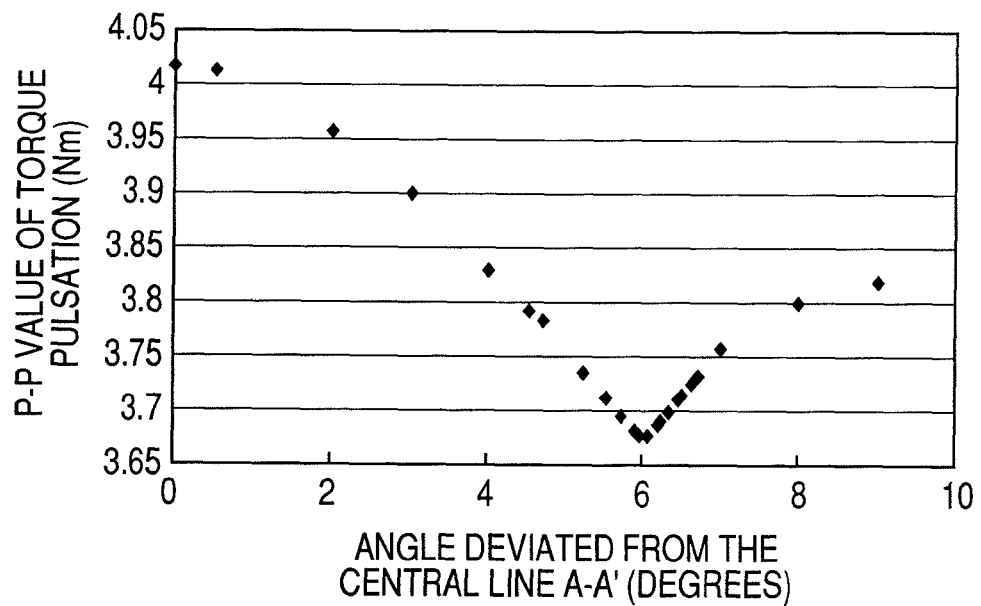
FIG. 26 shows the effect of reducing torque pulsation in the fifteenth embodiment.

In the conventional art, the rotor core shown in FIG. 24 is just laminated in the axial direction. In the present invention, however, as shown in FIG. 25, a layer Y1 with a thickness of about half in the axial direction is inverted around a central line A-A' extending in the radial direction between the magnetic poles of the permanent magnets 4, and laminated with another half layer X1 in the axial direction. Accordingly, torque pulsation can be reduced as shown in FIG. 26, and thus vibration and noise can be reduced regardless of a skew and stepped skew.

Sixteenth Embodiment

Figure 27:
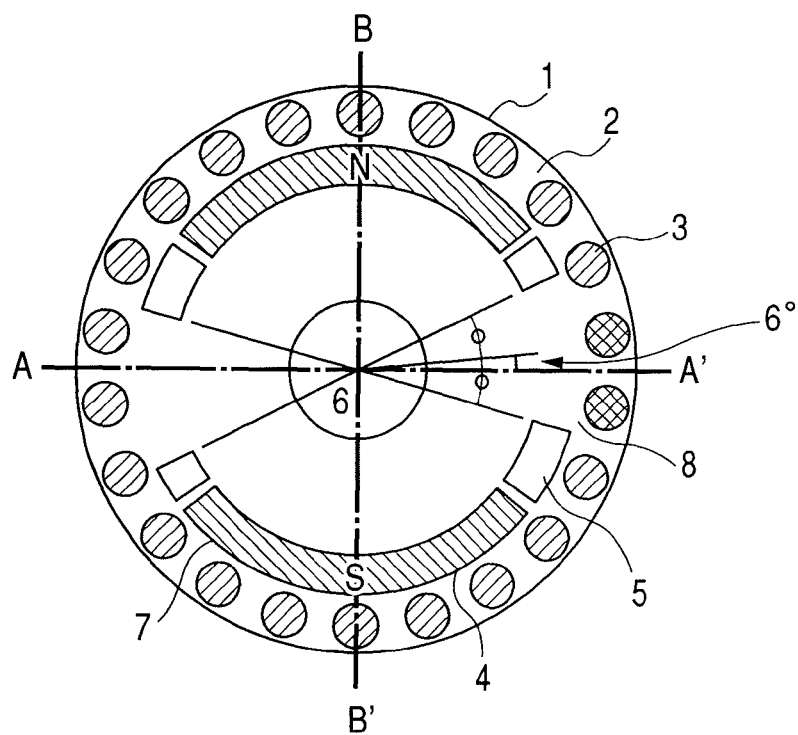
FIG. 27 shows the radial cross section of the rotor of a self-initiated permanent magnet synchronous motor according to a sixteenth embodiment of the present invention.

FIG. 27 shows the radial cross section of the rotor of a self-initiated permanent magnet synchronous motor according to a sixteenth embodiment of the present invention. In FIG. 27, components identical to those in FIG. 24 are assigned the same reference numerals, and duplicate explanation will be eliminated. As shown in FIG. 27, the magnetic substance 8 between the magnetic poles is deviated by an electrical angle of approximately 60 with respect to a central line A-A' extending in the radial direction between the magnetic poles of the permanent magnets 4, maximizing the effect of reducing the torque pulsation. When the electrical angle is deviated within the range of 5° to 7°, a significant reduction effect can be obtained as shown in FIG. 26.

Seventeenth Embodiment

Figure 28:
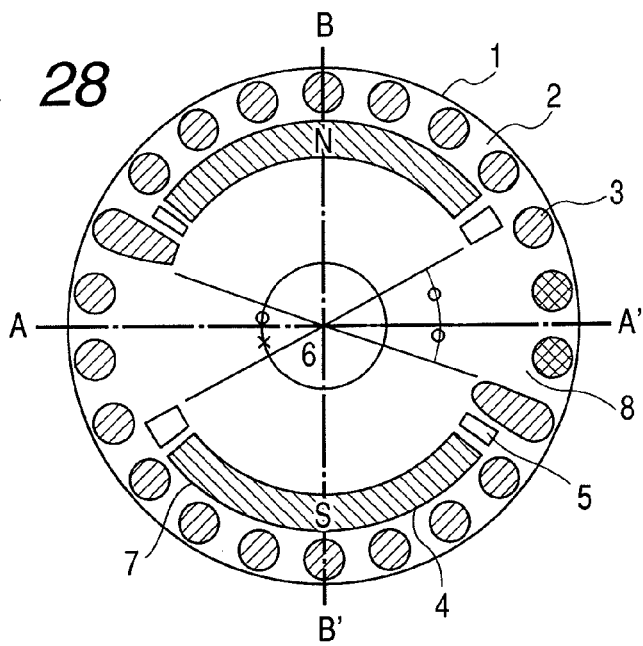
FIG. 28 shows the radial cross section of the rotor of a self-initiated permanent magnet synchronous motor according to a seventeenth embodiment of the present invention.

FIG. 28 shows the radial cross section of the rotor of a self-initiated permanent magnet synchronous motor according to a seventeenth embodiment of the present invention. In FIG. 28, components identical to those in FIG. 24 are assigned the same reference numerals, and duplicate explanation will be eliminated. As shown in FIG. 28, magnetic substances 8 are made asymmetrical with respect to a central line A-A' extending in the radial direction between the magnetic poles of the permanent magnets 4 by disposing some of the cage-type windings disposed 3 between the magnetic poles of the permanent magnets 4 so that they are deepened radially toward the inside. Furthermore, a layer Y1 with a thickness about half in the axial direction is inverted around a central line A-A' extending in the axial direction between the magnetic poles of the permanent magnets 4, and laminated. Characteristics similar to those in the first embodiment can also be obtained from this structure.

Eighteenth Embodiment

Figure 29:
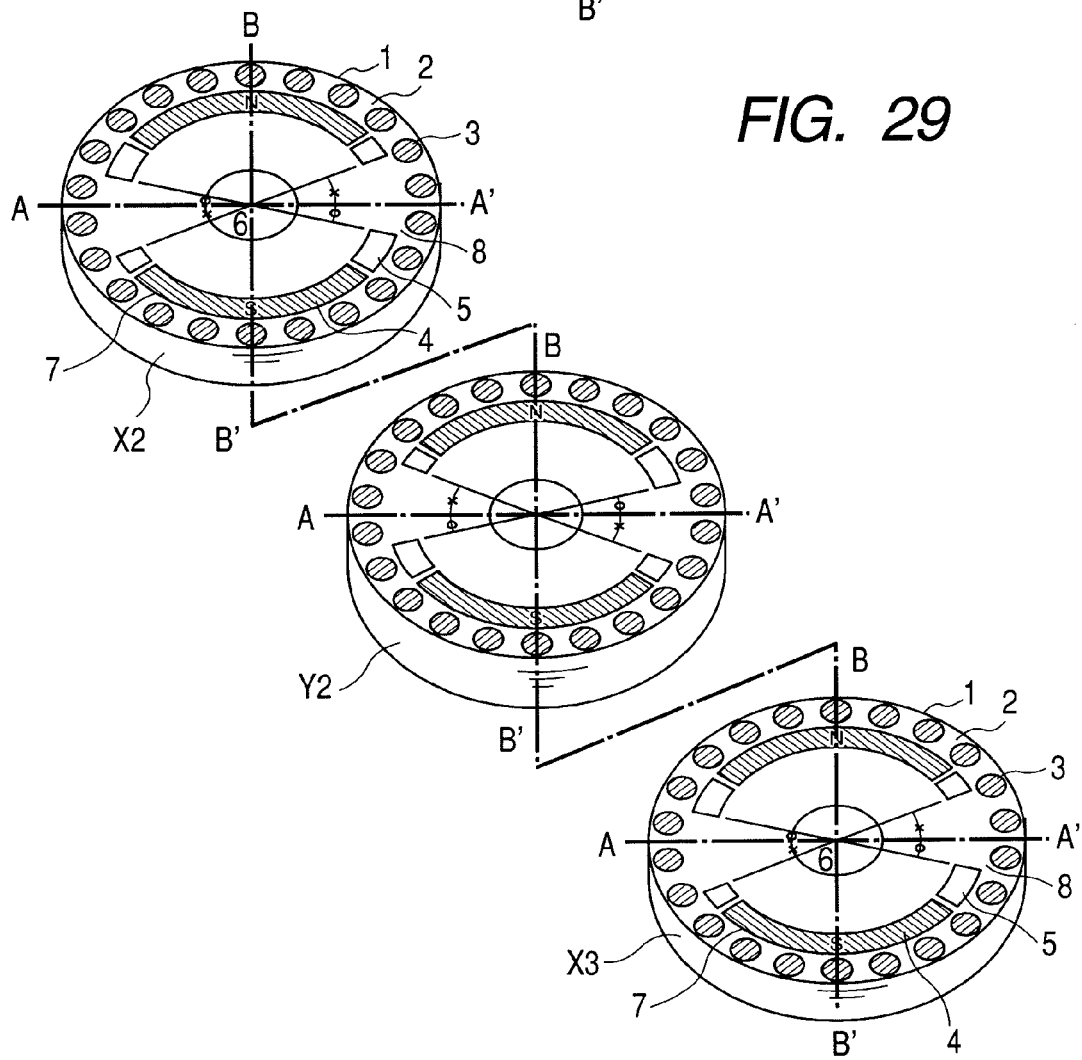
FIG. 29 shows an axial cross section of the rotor of a self-initiated permanent magnet synchronous motor according to a eighteenth embodiment of the present invention.

FIG. 29 shows an axial lamination of the rotor of a self-initiated permanent magnet synchronous motor according to an eighteenth embodiment of the present invention. In FIG. 29, components identical to those in FIG. 24 are assigned the same reference numerals, and duplicate explanation will be eliminated. The permanent magnet synchronous motor has holes 5 and magnetic substances 8 between the magnetic poles of the permanent magnets 4. The holes 5 and magnetic substances 8 are arranged so that they have asymmetry with respect to a central line A-A' extending in the axial direction between the magnetic poles of the permanent magnets 4. As shown in FIG. 29, a layer to be disposed as a top layer X2 in the axial direction, with a thickness of one-fourth, an intermediate layer Y2 with a thickness half, and a bottom layer X3 with a thickness of one-fourth are laminated, only the intermediate layer being inverted around a central line A-A' extending in the axial direction between the magnetic poles of the permanent magnets 4. Characteristics similar to those in the first embodiment can also be obtained from this structure, and thrust force can be averaged. Let T be a torque pulsation component before a skew is applied. When a skew as shown in FIG. 25 is applied, the pulsation component of Y1 and X1 are respectively T/2 and −T/2, the sum of the two pulsation components being zero. In FIG. 29 as well, the pulsation components of X2, Y2, and X3 are respectively −T/4, T/2, and −T/4, the sum being zero, proving the same effect as in FIG. 26.

Figure 30:
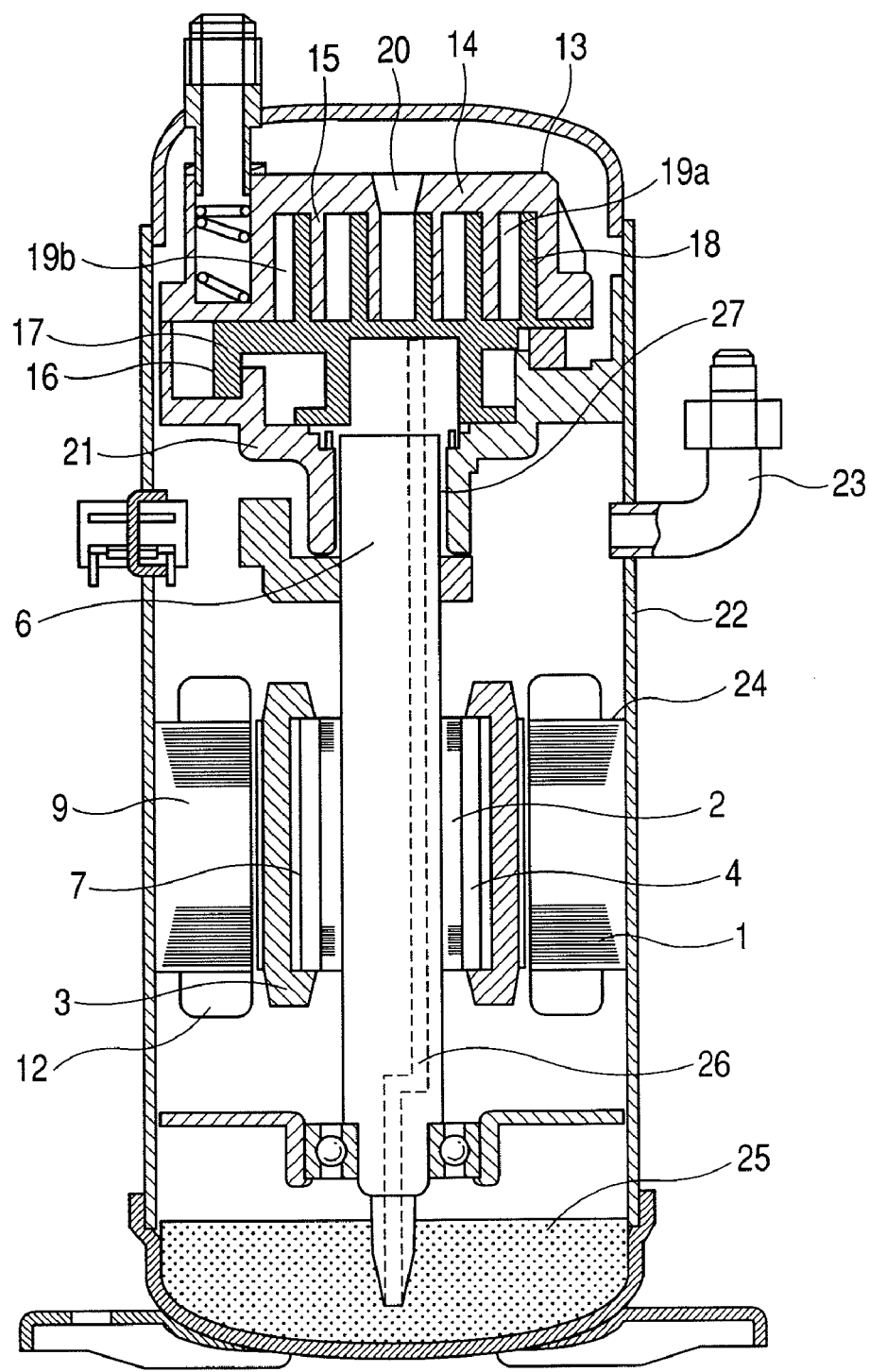
FIG. 30 shows the cross section of a compressor according to an embodiment of the present invention.

FIG. 30 shows the cross section of a compressor according to an embodiment of the present invention. The compressing mechanical part in FIG. 30 is structured by engaging spiral wraps 15 and other spiral wraps 18, the spiral wraps 15 being disposed upright on an end plate 14 of a fixed scroll member 13, the spiral wraps 18 being disposed upright on an end plate 17 of a rotating scroll member 16. When the rotating scroll member 16 is rotated by a crank shaft 6, a compressing operation is performed.

Compression chambers 19 (19a, 19b, and so on) are defined by the fixed scroll member 13 and the rotating scroll member 16. Compression chambers 19 that are disposed at the most outer peripheral portion move toward the centers of the fixed scroll member 13 and the rotating scroll member 16 during rotating motion, gradually reducing the volume of these compression chambers 19.

When the compression chambers 19a and 19b almost reach the centers of the fixed scroll member 13 and rotating scroll member 16, the compressed gas in the compression chambers 19 is expelled from a discharge port 20, which communicates with the compression chambers 19. The expelled compressed gas is delivered through a gas path (not shown) disposed in the fixed scroll member 13 and a frame 21 to a compression vessel 22 disposed below the frame 21, and then expelled to the outside of the compressor through a discharge pipe 23 provided on the side wall of the compression vessel 22. A permanent magnet synchronous motor 24, comprising a stator 9 and a rotor 1 as shown in FIGS. 24 to 30, is hermetically included in the compression vessel 22. The permanent magnet synchronous motor 24 rotates at fixed revolutions to perform a compression operation.

An oil reservoir 25 is provided below the permanent magnet synchronous motor 24. Oil in the oil reservoir 25 is supplied through an oil passage 26 provided in the crank shaft 6 to a sliding part between the rotating scroll member 16 and the crank shaft 6, a sliding bearing 27, and other components by use of a pressure difference caused by rotational motion, the oil being used to lubricate these components.

Accordingly, when one of the self-initiated permanent magnet synchronous motors shown in FIGS. 24 to 30 is used as a compressor driving motor, the vibration and noise of a compressor at a constant speed can be reduced.

The embodiments described above can each provide a self-initiated permanent magnet synchronous motor that can reduce vibration, noise, and torque pulsation, as well as its rotor and a compressor that uses the self-initiated permanent magnet synchronous motor.

What is claimed is:

1. A permanent magnet synchronous motor that has a stator with a stator winding and a rotor rotatably supported along an inner periphery of the stator with a fixed clearance therebetween and includes many slots provided in an axial direction along an outer periphery of a rotor iron core, which is part of the rotor, electrically conductive bars embedded in the slots, electrically conductive end rings, each of which connects one of the bars to an end surface in the axial direction, and permanent magnets embedded along an inner periphery of the bars, wherein:

the permanent magnet synchronous motor has holes, magnetic substances, and bridges, each of which is formed between one of the permanent magnets and one of the holes, in a peripheral direction between the magnetic poles of the permanent magnets;

a pitch angle θ of the magnetic substance in the peripheral direction is larger than a distance of the bridge in the peripheral direction, which is formed between the permanent magnet and the hole; and wherein a ratio θ/β of the pitch angle θ of the magnetic substance in the peripheral direction to the pitch angle β between magnetic poles in the peripheral direction is set within a range of 0.17 to 0.80.

2. The permanent magnet synchronous motor according to claim 1, wherein a pitch angle θ of the magnetic substance in the peripheral direction is larger than a total a of the angles of the bridges, each of which is included in one magnetic pole of the permanent magnets.

3. The permanent magnet synchronous motor according to claim 1, wherein the permanent magnets are disposed straightly or in a V, trapezoidal, or approximately circular arc shape.

4. The permanent magnet synchronous motor according to claim 1, wherein the holes are formed adjacent to an inner periphery of the conductive bars.

5. The permanent magnet synchronous motor according to claim 4, wherein a layer with an arbitrary thickness in the axial direction is inverted around a central line extending in radial direction between the magnetic poles of the permanent magnets, and laminated.

6. The permanent magnet synchronous motor according to claim 1, wherein the holes and the magnetic substances are arranged so that they have asymmetry with respect to a central line extending in radial direction between the magnetic poles of the permanent magnets.

7. The permanent magnet synchronous motor according to claim 1, wherein the number of magnetic poles of the permanent magnets is two.

8. The permanent magnet synchronous motor according to claim 1, wherein the number of slots in the stator is 30 to 36.

9. The permanent magnet synchronous motor according to claim 1, wherein the number of conductive bars embedded in the slots is 22 or 28.

10. A rotor, in a permanent magnet synchronous motor, that has a rotor iron core, many slots provided in an axial direction along an outer periphery of the rotor iron core, electrically conductive bars embedded in the slots, electrically conductive end rings, each of which connects one of the bars to an end surface in the axial direction, and permanent magnets embedded along an inner periphery of the bars, wherein:

the permanent magnet synchronous motor has holes, magnetic substances, and bridges, each of which is formed between one permanent magnet and one hole, in a peripheral direction between the magnetic poles of the permanent magnets;

a pitch angle θ of the magnetic substance in the peripheral direction is larger than a distance of the bridge in the peripheral direction, which is formed between the permanent magnet and the hole; and wherein a ratio θ/β of the pitch angle θ of the magnetic substance in the peripheral direction to the pitch angle β between magnetic poles in the peripheral direction is set within a range of 0.17 to 0.80.

11. A compressor that has a compressing mechanical part for inhaling, compressing, and expelling a coolant and a driving motor for driving the compressing mechanical part, wherein:

the driving motor is a permanent magnet synchronous motor that has a stator with a stator winding and a rotor rotatably supported along an inner periphery of the stator with a fixed clearance therebetween and includes many slots provided in an axial direction along an outer periphery of a rotor iron core, which is part of the rotor, electrically conductive bars embedded in the slots, electrically conductive end rings, each of which connects one of the bars to an end surface in the axial direction, and permanent magnets embedded along an inner periphery of the bars;

the permanent magnet synchronous motor has holes, magnetic substances, and bridges, each of which is formed between one of the permanent magnets and one of the holes, in a peripheral direction between the magnetic poles of the permanent magnets;

a pitch angle θ of the magnetic substance in the peripheral direction is larger than a distance of the bridge in the peripheral direction, which is formed between the permanent magnet and the hole; and wherein a ratio θ/β of the pitch angle θ of the magnetic substance in the peripheral direction to the pitch angle β between magnetic poles in the peripheral direction is set within a range of 0.17 to 0.80.

* * * * *